United States Patent Office 3,076,814
Patented Feb. 5, 1963

3,076,814
NOVEL PROCESS FOR THE PREPARATION OF TRYPTOPHOLS AND TO NOVEL COMPOUNDS PRODUCED THEREIN
Merrill E. Speeter and William C. Anthony, Kalamazoo Township, Kalamazoo County, Mich., assignors to The Upjohn Company, Kalamazoo, Mich., a corporation of Michigan
No Drawing. Filed Apr. 28, 1954, Ser. No. 426,303
9 Claims. (Cl. 260—319)

The present invention relates to a novel process for the preparation of 3-(2-hydroxyethyl)-indoles (tryptophols) and to novel compounds produced therein. More particularly, the invention is concerned with the reduction of 3-indoleglyoxylic acids or 3-indoleglycolic acids with lithium aluminum hydride and to novel 3-indoleglyoxylic acids and to novel 3-indoleglycolic acids useful therein.

It is known that 3-indoleglyoxylic acid esters can be reduced with aluminum amalgam [Baker, J. Chem. Soc. 1940, 458–60], but in the disclosed Baker process, the ring-attached carbonyl group is reduced only to a carbinol group and the carboxylic carbonyl is not reduced at all. Thus, when Baker reduced 3-indoleglyoxylic acid esters (the methyl or ethyl ester) with aluminum amalgam, he obtained the corresponding ester of 3-indoleglycolic acid. It is known also that certain glyoxylic acids can be reduced with lithium aluminum hydride. By this process, however, the corresponding ethylene glycol is obtained. Thus phenylglyoxylic acid was reduced with lithium aluminum hydride by Nystrom et al., J. Am. Chem. Soc. 69, 2548–9 (1947), to phenylethylene glycol.

It has been found, contrary to the teachings of the prior art, that when lithium aluminum hydride is used to reduce a 3-indoleglyoxylic acid that the ring-attached carbonyl group is reduced to a methylene group and the corboxylic acid radical is reduced to a carbinol radical to give the corresponding tryptophol. It has been found further that the intermediate reduction products, 3-indoleglycolic acids, are likewise reduced to the corresponding tryptophols.

The process of the present invention is applicable to 1-hydro-3-indoleglyoxylic acids or 1-hydro-3-indoleglycolic acids. The term "1-hydro" is used to denote the presence of hydrogen in the 1-position of the indole nucleus. The indole nucleus, otherwise, can be substituted or unsubstituted. Substituents reducible with lithium aluminum hydride under the conditions of the present process are usually undesirable unless the reduced form of the substitutent is desired in the final compound. The 3-indoleglyoxylic acid can be either in its free form or in a combined form, e.g., as a salt, an ester, acid anhydride (simple or mixed), or acid halide, because whether the free acid form or combined form is used, the same end product, a tryptophol, is obtained. The 3-indoleglycolic acid can also be either in its free form or in a combined form, e.g., as a salt, or an ester, because in any case the same end product, tryptophol, is obtained. The 3-indoleglycolic acid halides and anhydrides are not included as fixed forms because of their instability due to the alpha hydroxyl group.

It has been found further in accordance with the present invention, that the desired tryptophol can be obtained in high yield by subjecting the starting indole( i.e., a 1-hydroindole) to glyoxylation with an oxalyl halide, and converting the 3-indoleglyoxylyl halide thus formed to a tryptophol by reduction with lithium aluminum hydride. By this process an indole can easily be converted to the desired tryptophol in high yield. The desired tryptophols of the present invention are thus effectively obtained in high overall yield by subjecting the starting indole successively to glyoxylation with an oxalyl halide, and reduction with lithium aluminum hydride. It is sometimes advantageous, however, to convert the 3-indoleglyoxylyl halide to an ester, to an acid anhydride, to the free acid, or to a salt, before the lithium aluminum hydride reduction.

It is likewise sometimes advantageous to partially reduce the free 3-indoleglyoxylic acid, or ester, or salt thereof, to the corresponding free 3-indoleglycolic acid, ester, or salt, respectively, before completing the reduction with lithium aluminum hydride. Thus by the process of the present invention, an indole can be converted to a tryptophol in excellent yield by subjecting the starting indole successively to glyoxylation with an oxalyl halide, reducing the resulting 3-indoleglyoxylyl halide (or an equivalent form thereof) with lithium aluminum hydride, or partially reducing the free 3-indoleglyoxylic acid, ester, or salt thereof, to the corresponding 3-indoleglycolic acid, and then completing the reduction of the latter with lithium aluminum hydride to obtain the desired tryptophol.

Other procedures for the preparation of 3-indoleglyoxylic acids are known in the art. Baker supra, for example, describes the preparation of methyl 3-indoleglyoxylate through the interaction of the indole magnesium iodide and methyl oxalyl chloride. A like process is shown by Majima et al., Ber. 57, 1449–53 (1924); Oddo et al., Gazz. chim. ital. 57, 827–35 (1937). Elks et al., J. Chem. Soc. 1944, 630, prepared ethyl 3-indoleglyoxylate by the reaction of ethyl oxalate and indole. Ethyl 2-methyl-3-indoleglyoxylate is prepared by reacting 2-methylindole with ethyl oxalate according to Angeli et al., Atti. accad. Lincei, 16 [II], 790–5; C.A. 2, 1833 (1908); Chem. Zentr. 1908, I, 739. Giua, Gazz. chim. ital. 54, 593–7 (1924), discloses the preparation of 2-methyl-3-indoleglyoxylyl chloride through the direct action of oxalyl chloride on 2-methylindole. He also mentions the preparation of 2-indoleglyoxylyl chloride but according to the present invention it has been found that the direct interaction of indole and oxalyl chloride gives only 3-indoleglyoxylyl chloride. Other esters can be prepared by subjecting the acid or the anhydride, and particularly the acid halide, to alcoholysis. Any alcohol (including phenols) can be used since, as above noted, the hydrocarbon radical of the alcohol does not appear in the final product. By following one or more of the above procedures, and using the appropriate indole, various starting 3-indoleglyoxylic acids for use in the process of this invention can easily be prepared.

For the purpose of more fully illustrating the present invention, the starting indoles, for the most part, can be represented by the following formula:

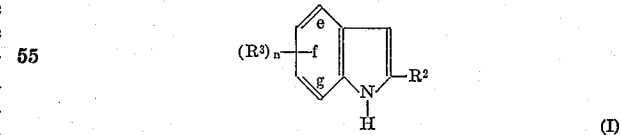

wherein $R^2$ represents hydrogen; an aryl radical, e.g., the radicals of the benzene and naphthalene series such as phenyl, naphthyl, lower-alkyl substituted phenyl and naphthyl such as tolyl and 2-methylnaphthyl, lower-alkoxy substituted phenyl and naphthyl, such as methoxyphenyl and 2-ethoxynaphthyl, halogen substituted phenyl and naphthyl such as chlorophenyl, 2-chloronaphthyl, biphenylyl, and the like; an aralkyl radical, e.g., benzyl, phenethyl, halobenzyl such as para-chlorobenzyl, alkylbenzyl such as para-ethylbenzyl, alkoxybenzyl such as para-methoxybenzyl, and the like; a lower-alkyl radical containing up to and including eight carbon atoms, e.g., methyl, propyl, octyl, and the like; and $R^2$ advantageously contains not more than fifteen carbon atoms.

R³ represents halogen, e.g., chlorine, bromine, and iodine; a cyano radical; a carboxy radical; a lower-carbalkoxy radical, e.g., carbomethoxy, carbethoxy, carbobutoxy, and the like; a dialkylamino radical, e.g., dimethylamino, diethylamino, methylbutylamino, and the like; a lower-alkyl radical; an aryl radical; an aralkyl radical; an aryloxy radical, e.g., phenoxy, and the like; a lower-alkoxy radical, e.g., methoxy, isopropoxy, butoxy, and the like; a benzyloxy radical, e.g., benzyloxy, benzhydryloxy, alkylbenzyloxy, such as para-methylbenzyloxy and para,para′-dimethylbenzhydryloxy, halobenzyloxy, such as para-chlorobenzyloxy, and para,para′-dichlorobenzhydryloxy, alkoxybenzyloxy, such as para-methoxybenzyloxy and para,para′-dimethoxybenzhydryloxy, and the like; an acyloxy radical wherein the acyl residue is from an organic carboxylic acid containing from one to eight carbon atoms, e.g., formoxy, acetoxy, butyroxy, propionoxy, benzoxy, and the like; and a fused arylene radical, e.g., phenylene, naphthylene, and the like; and R³ advantageously contains not more than fifteen carbon atoms. $n$ is an integer from zero to four, and when $n$ is greater than one the R³'s can be alike or different. When $n$ is less than four, of course, it is understood that the carbon atoms at the remaining positions of the benzene ring have hydrogen attached thereto. A fused arylene radical, as used herein, encompasses a divalent arylene radical which is attached at sides e, f, or g of the benzene ring of the indole nucleus.

The various substituted indoles employed in the preparation of the essential 3-indoleglyoxylyl halides can be prepared by one of the following procedures:

(1) The 4- and 5-acyloxyindoles are prepared in the manner disclosed by Beer et al. (J. Chem. Soc. 1948, 1605–9), in the preparation of 4- and 5-acetoxyindoles by utilization of the corresponding acylating agent. The 6- and 7-acyloxyindoles are prepared in the same manner utilizing 4-hydroxy-2-nitrobenzaldehyde (Sachs, Ber. 39, 2758), and 3-hydroxy-2-nitrobenzaldehyde (Hodgson et al., J. Chem. Soc. 1925, 877), respectively, as the starting compounds.

(2) The starting 4-, 5-, 6-, and 7-benzyloxyindoles can be prepared by the following procedure:

(a) Benzlyating 3-hydroxy-2-nitrobenzaldehyde, 4-hydroxy-2-nitrobenzaldehyde, 5-hydroxy-2-nitrobenzaldehyde (Beer et al., supra), 6-hydroxy-2-nitrobenzaldehyde (Beer et al., supra) with a benzyl halide such as benzyl chloride, to produce the corresponding benzyloxy-2-nitrobenzaldehyde; and (b) Reacting the benzyloxy-2-nitrobenzaldehyde with a 1-nitroalkane in the presence of an alkali-metal hydroxide and at a temperature between about zero and about minus forty degrees centigrade to produce a benzyloxy-2-nitro-α-[1-(1-nitroalkyl)]-benzyl alcohol-alkali salt and thereafter acidifying the thus produced salt to yield the benzyloxy-2-nitro-α-[1-(1-nitroalkyl)]-benzyl alcohol, as more fully disclosed in U.S. Patent 2,698,345; and (c) Dehydrating the benzyloxy-2-nitro-α-[1-(1-nitroalkyl)]-benzyl alcohol by reacting the alcohol with an aliphatic acid anhydride at a temperature between about fifty and about 150 degrees centigrade, as more fully disclosed in copending application Serial No. 273,148, filed February 23, 1952, to produce a benzyloxy-β,2-dinitrostyrene; and (d) Subjecting the benzyloxy-β,2-dinitrostyrene to reductive cyclization by reacting the styrene with powdered iron in an organic acid medium, such as acetic, propionic, butyric, or the like, at a temperature between about 50 and about 120 degrees centigrade, as more fully disclosed in copending application Serial No. 273,149, filed Feburary 23, 1952, to produce the 7-benzyloxyindole, 6-benzyloxyindole, 4-benzyloxyindole, and 5-benzyloxyindole, respectively.

The starting halo, cyano, carboxy, carbalkoxy, dialkylamino, aryl, aralkyl, alkyl, and aryloxy substituted indoles can be prepared by reacting the corresponding benzaldehyde with a 1-nitroalkane, to prepare the benzyl alcohol, dehydrating and reductively cyclizing as described above.

(3) The starting alkoxyindoles employed in the process of the present invention are prepared by the procedure outlined by Blaikie et al. (J. Chem. Soc. 1924, 296), in the preparation of 4-, 5-, and 7-methoxyindoles by utilizing the requisite alkoxy-2-nitrotoluene. The 6-alkoxyindoles are prepared by the procedure employed by Kermack et al. (J. Chem. Soc. 1921, 1602).

(4) The preparation of 2-substituted indoles is advantageously carried out by various procedures, e.g., the Fischer synthesis, involving phenylhydrazines and the corresponding methyl ketones, is readily applicable to the preparation of 2-substituted indoles. In Elderfield, "Heterocyclic Compounds," vol. 3, page 14, 1952, John Wiley and Sons, is shown the reaction of phenylhydrazine and acetophenone to prepare 2-phenylindole. In a similar manner the 2-benzyl- and 2-naphthylindoles are prepared by utilizing the corresponding phenylhydrazine and the corresponding methyl ketone. The Fischer synthesis can also be employed to prepare 2-methylindoles by reacting acetone and the corresponding phenylhydrazine.

The preparation of other 2-lower-alkylindoles is advantageously carried out by the condensation of the corresponding benzaldehyde and 1-nitroalkane as more fully disclosed above and in U.S. Patent 2,698,345.

The starting fused arylene indoles, e.g., benzindoles, are prepared by the process described by Rydon et al., J. Chem. Soc. 1951, 2462.

Representative indoles which can be utilized in the process of the present invention include the following:

indole,
5-methoxyindole,
4-acetoxyindole,
5-benzyloxyindole,
5-(para-methylbenzyloxy)-indole,
5-ethoxyindole,
7-methoxyindole,
5-methoxy-2-phenylindole,
5-ethoxy-2-phenylindole,
6-acetoxy-2-phenethylindole,
5-acetoxy-2-methylindole,
6-(para-chlorobenzyloxy)-indole,
7-benzhydryloxyindole,
4-(para-methoxybenzyloxy)-indole,
6-(para,para′-dimethylbenzhydryloxy)-indole,
5-benzhydryloxy-indole,
6-ethoxy-2-(para-ethylbenzyl)-indole,
7-propionyloxy-2-phenethylindole,
5-butyryloxy-2-ethylindole,
6-hexanoyloxyindole,
4-benzyloxyindole,
6-benzhydryloxy-2-naphthylindole,
7-benzyloxy-2-tolylindole,
7-benzhydryloxy-2-(para-methylphenyl)-indole,
4-(para-methylbenzyloxy)-2-methylindole,
6-(para,para′-dichlorobenzhydryloxy)-indole,
5-(para-chlorobenzyloxy)-indole,
4-(para,para′-dimethylbenzhydryloxy)-2-(para-ethylbenzyl)-indole,
5-(para,para′-dimethoxybenzhydryloxy)-2-methylindole,
4-benzyloxy-2-ethylindole,
4-benzhydryloxyindole,
4-methoxyindole,
7-ethoxy-2-(para-chlorophenyl)-indole,
4-propoxy-2-(para-ethylbenzyl)-indole,
6-butoxyindole,
5-(para,para′-dichlorobenzhydryloxy)-2-(para-ethoxybenzyl)-indole,
6-hexanoyloxy-2-phenylindole,
7-octanoyloxy-2-naphthylindole,
5-benzyloxy-2-naphthylindole,
4-benzhydryloxy-2-(2-ethoxynaphthyl)-indole, 7-(para,para'-diethoxybenzhydryloxy)-2-(para-chlorobenzyl)-indole,
4-hexoxy-2-(para-ethoxyphenyl)-indole,
6-hexanoyloxy-2-naphthylindole,
4-octanoyloxyindole,
6-(para,para'-dibromobenzhydryloxy)-2-phenylindole,
6-propoxy-2-ethylindole,
4-methoxy-2-propylindole,
5-acetoxy-2-ethylindole,
5-ethoxy-2-(2-chloronaphthyl)-indole,
5-propionyloxy-2-(para-ethylbenzyl)-indole,
4-propionyloxy-2-(para-bromobenzyl)-indole,
4-acetoxy-2-phenethylindole,
4-butyryloxy-2-(para-propylphenyl)-indole,
5-propoxy-2-ethylindole,
6-(para,para'-dichlorobenzhydryloxy)-2-naphthylindole,
7-ethoxy-2-ethylindole,
7-butoxy-2-propylindole,
4-chloroindole,
6-carbethoxyindole,
7-cyanoindole,
5-carboxyindole,
5-cyanoindole,
6-carbomethoxyindole,
5-bromoindole,
7-bromo-2-ethylindole,
4-carbomethoxy-2-benzylindole,
7-cyano-2-tolylindole,
6-carboxy-2-(2-methylnaphthyl)-indole,
4-carbomethoxy-2-phenylindole,
6-carboxy-2-methylindole,
4-cyano-2-phenethylindole,
6-carbopropoxy-2-propylindole,
5-carbobutoxy-2-butylindole,
4-cyano-2-phenethylindole,
4-carboxy-2-phenylindole,
6-carboxyindole,
6-cyano-2-(para-methoxybenzyl)-indole,
4-carbethoxy-2-ethylindole,
4,5-dimethoxy-2-methylindole,
5,7-dichloroindole,
4,7-dicarbethoxy-2-ethylindole,
6,7-dibenzyloxyindole,
5-benzyloxy-6-chloroindole,
6-acetoxy-7-methoxyindole,
5-diethylaminoindole,
6-dimethylamino-2-methylindole,
5,6-dimethoxyindole,
5-bromoindole,
2-hexylindole,
4-methylindole,
5-methylindole,
6-methylindole,
7-methylindole,
2,5-dimethylindole,
5,6-dimethylindole,
2,5-diphenylindole,
2,4-diphenylindole,
5-benzylindole,
4-phenethylindole,
5,7-dichloro-2-biphenylindole,
2-t-butylindole,
2,4,7-trimethylindole,
1-benz-(g)-indole,
1-benz-(f)-indole,
5-phenoxyindole, and the like.

In accordance with a preferred procedure of the present invention the 3-indoleglyoxylyl halides are prepared by reacting an indole with an oxalyl halide in the presence of an inert organic solvent, such as ether, petroleum ether, methylcyclohexane, dioxan, and the like. Aromatic hydrocarbons such as benzene, and the like, can also be employed when the acid halide is not to be isolated. Stoichiometric quantities (i.e., equimolar) are advantageously employed. The reaction is advantageously conducted at about 25 degrees centigrade, although other temperatures between about ten degrees centigrade and about the boiling point of the solvent employed can also be utilized. The reaction is generally completed between about fifteen minutes and about eight hours, longer periods being required for lower reaction temperatures and/or less reactive indoles. The reaction mixture generally reddens, but soon decolorizes, whereupon a precipitate generally begins to form. After standing between about one and about eight hours, the reaction mixture is cooled to about zero degrees centigrade and the 3-indoleglyoxylyl halide precipitate can be recovered by filtration.

The 3-indoleglyoxylyl halides thus-produced can be readily converted by processes well known in the art to the free acid, ester, acid anhydride, or salt. For example, a 3-indoleglyoxylyl halide is converted to the free acid by hydrolysis, to an ester by alcoholysis, to a salt by an alkaline hydrolysis, or to a carboxylic acid anhydride by reaction with a metal salt of a carboxylic acid, e.g., potassium acetate, sodium 3-indoleglyoxylate, and the like.

The 3-indoleglyoxylic acids and 3-indoleglycolic acids employed in the present process are, for the most part, therefore, represented as having the formula:

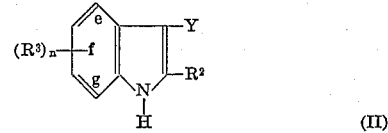

(II)

wherein $R^2$, $R^3$, and $n$ have the values represented above. Y represents

wherein R represents a carboxylic acid radical either in the free form or combined as an ester, an acid anhydride, acid halide, or salt, e.g., a carboxy radical or an ester, a salt, a carboxylic acid anhydride, or an acid halide thereof, and Y also represents

wherein R' is a carboxy radical or an ester or salt thereof.

In accordance with the process of the present invention the 3-indoleglyoxylic acids, thus characterized, are reduced with lithium aluminum hydride to produce the tryptophols which can be represented as having the formula:

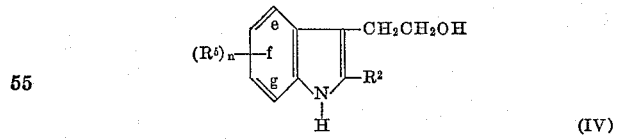

(IV)

wherein $R^2$ and $n$ have the values represented above and $R^5$ represents hydroxy, dialkylamino, methylol

aminomethyl ($-CH_2NH_2$), halogen, lower-alkyl, aryl, aralkyl, aryloxy, a fused arylene radical, a benzyloxy radical, and a lower-alkoxy radical. Reduction of the 3-indoleglyoxylic acids wherein $R^3$, as previously identified, is an acyloxy, cyano, carboxy, or a lower-carbalkoxy radical, results in the conversion of these substituents to a hydroxy, aminomethyl ($-CH_2NH_2$), methylol

and methylol radical, respectively.

The reduction of the 3-indoleglyoxylic acids is advantageously carried out in the presence of an inert solvent such as ether, tetrahydrofuran, N-ethylmorpholine, and dibutyl ether, and the like, with tetrahydrofuran being preferred. The reduction is advantageously accomplished at the boiling point of the solvent used, although other temperatures between about zero and about 100 degrees centigrade can be employed, and preferably zero to 65 degrees centigrade. After a suitable reaction period, usually from thirty minutes to five hours, the free tryptophols are readily obtained as viscous oils, or in some instances in crystalline condition, by hydrolyzing the reaction mixture with aqueous ether followed by dilute alkali, decanting the solvent layer, extracting the alkaline residue with several portions of ether, combining the ether extracts and decanted solvent layer, and evaporating the combined solvent. Other conventional procedures for the hydrolysis can be used if desired, and other organic solvents can be used in place of ether.

The reduction of the starting free 3-indoleglyoxylic acid, ester, or salt thereof, can also be accomplished in a stepwise manner, if so desired. For example, the starting acid, ester, or salt can be partially reduced by utilizing reducing agents other than lithium aluminum hydride, and completing the reduction to a tryptophol with lithium aluminum hydride. Thus by using reducing agents such as sodium borohydride, lithium borohydride, aluminum amalgam, and catalytic means such as platinum oxide and hydrogen, a free 3-indoleglyoxylic acid, ester, or salt, can be reduced to a corresponding 3-indoleglycolic acid which in turn can be reduced with lithium aluminum hydride to produce the desired tryptophol.

The tryptophols produced by the process of the present invention can be converted to pharmacologically active tryptamines, i.e., 3-(2-aminoethyl)-indoles, or to intermediate tryptamines which are valuable in the preparation of pharmacologically active compounds. The tryptophols, e.g., can be brominated as disclosed by Snyder et al., J. Am. Chem. Soc. 70, 1962 (1948), and the brominated products converted to the desired tryptamines by reaction with amines as disclosed by Shimodira, Ann., 520, 25–26 (1936).

The 4-, 5-, 6-, and 7-benzyloxy- and alkoxy-3-(2-aminoethyl)-indoles, which can thus be produced from the corresponding tryptophols, are valuable intermediates in the preparation of hydroxy-3-(2-aminoethyl)-indoles including serotonin, i.e., 5-hydroxy-3-(2-aminoethyl)-indole. Serotonin was originally reported by Rapport, J. Biol. Chem. 180, 961 (1949), and shown to possess vasoconstrictor properties. The other hydroxy-3-(2-aminoethyl)-indoles also possess vasoconstrictor activity. The hydroxy-3-(2-aminoethyl)-indoles are prepared from the 4-, 5-, 6-, or 7-benzyloxy or alkoxy substituted 3-(2-aminoethyl)-indoles of the present invention by debenzylation or dealkylation, respectively. The debenzylation of the benzyloxy-3-(2-aminoethyl)-indoles is carried out by hydrogenolysis in the presence of a catalyst, advantageously palladium on charcoal, as more fully disclosed in copending application Serial Number 289,872, filed May 24, 1952. The alkoxy-3-(2-aminoethyl)-indoles are dealkylated with aluminum chloride according to the procedure outlined by Asero et al., Ann. 576, 69–74 (1952). The reduction of 4-, 5-, 6-, and 7-acyloxy-3-indoleglyoxylic acids according to the process of the present invention results in reduction of the carbonyl groups of the glyoxylic acid fragment and also results in the simultaneous deacylation of the indole to the hydroxy tryptophol, from which pharmacologically active hydroxy-3-(2-aminoethyl)-indoles can be prepared.

The non-hydroxylated tryptamines, e.g., halo-3-(2-aminoethyl)-indoles, aminomethyl-3-(2-aminoethyl)-indoles, methylol-3-(2-aminoethyl)-indoles, dialkylamino-3-(2-aminoethyl)-indoles, 3-(2-aminoethyl)-indoles, alkyl-3-(2-aminoethyl)-indoles, aryl-3-(2-aminoethyl)-indoles, aralkyl-3-(2-aminoethyl)-indoles, aryloxy-3-(2-aminoethyl)-indoles, and fused arylene (e, f, and g) 3-(2-aminoethyl)-indoles, which can be obtained by the process outlined above, have diuretic, oxytocic, antioxytocic, antibacterial, and hypnotic properties. The 3-(2-N-mono- substituted aminoethyl)-indoles which can be obtained from the tryptophols as described above, e.g., 3-(2-N-methylaminoethyl)-indole, have peculiarly enough oxytocic properties whereas the 3-(2-N,N-disubstituted aminoethyl)-indoles e.g., 3-(2-N,N-diethylaminoethyl)-indole, have antioxytocic properties. The non-hydroxylated amines have also demonstrated potent depressor activity.

In addition they are also useful in the preparation of pickling inhibitors as more fully disclosed in U.S. Patent 2,586,331, issued February 19, 1952.

The following examples are illustrative of the process and products of the present invention, but are not to be construed as limiting.

EXAMPLE 1

Tryptophol [3-(2-Hydroxyethyl)-Indole]

To a solution of 25 grams of indole and 500 milliliters of anhydrous ether at about 23 degrees centigrade was added 25 milliliters of oxalyl chloride. After the vigorous reaction had subsided the precipitate, 3-indoleglyoxylyl chloride, was collected, washed with ether, and added to 200 milliliters of absolute ethanol. After standing for a period of about sixty hours, the precipitate was collected, washed with a small amount of alcohol and dried to yield 38 grams of ethyl 3-indoleglyoxylate which melted at 183.5–184.5 degrees centigrade.

A suspension of thirty grams of ethyl 3-indoleglyoxylate and 700 milliliters of tetrahydrofuran was added over a period of about one hour to a refluxing mixture of one thousand milliliters of tetrahydrofuran and 13.1 grams of lithium aluminum hydride. After refluxing for about four hours the mixture was cooled and a solution of five milliliters of water and fifty milliliters of tetrahydrofuran was added dropwise, followed by the addition of fifty milliliters of ten percent sodium hydroxide solution. The precipitate was collected, washed with ether, and the combined filtrates were concentrated. The residue was distilled yielding 18.8 grams of tryptophol, 3-(2-hydroxyethyl)-indole, which distilled at 150–154 degrees centigrade/0.06 millimeters of mercury. Upon cooling the distillate crystallized and melted at 56.8 degrees centigrade.

EXAMPLE 2

Tryptophol

Twenty grams of 3-indoleglyoxylyl chloride, prepared as disclosed in Example 1, was added to forty grams of benzyl alcohol; the mixture was allowed to stand for 48 hours and was then diluted with ether. Twenty-six grams of precipitate, benzyl 3-indoleglyoxylate, was removed by filtration, recrystallized from isopropanol and melted at 171–172 degrees centigrade.

Tryptophol is produced by reducing benzyl 3-indoleglyoxylate with lithium aluminum hydride by the procedure disclosed in Example 1.

EXAMPLE 3

Tryptophol

Five grams of 3-indoleglyoxylyl chloride, prepared as disclosed in Example 1, was suspended in benzene and ten grams of β-diethylaminoethanol added thereto. The mixture was allowed to stand at 25 degrees centigrade for several hours, and thereupon diluted with sodium hydroxide, to yield β-diethylaminoethyl 3-indoleglyoxylate.

Tryptophol is produced by reducing β-diethylaminoethyl 3-indoleglyoxylate with lithium aluminum hydride by the procedure disclosed in Example 1.

EXAMPLE 4

5-Benzloxytryptophol

To a solution of 17.6 grams (0.079 mole) of 5-benzyloxyindole in 800 milliliters of anhydrous ether was added a solution of 9.6 grams (0.076 mole) of oxalyl chloride in 100 milliliters of dry ether. A light yellow precipitate began to separate from the ether solution after about fifteen minutes; after four hours the mixture was cooled in an ice bath and the yellow precipitates recovered by filtration. After washing with several portions of dry ether, the compound was dried in a vacuum desiccator. The compound melted at 146–150 degrees centigrade. The yield of crystalline 5-benzyloxy-3-indoleglyoxylyl chloride was fourteen grams, a yield of approximately 88 percent.

One gram of 5-benzyloxy-3-indoleglyoxylyl chloride was added to twenty milliliters of anhydrous ethanol, and the solution was refluxed for one hour and thereupon cooled. One gram of product, ethyl 5-benzyloxy-3-indoleglyoxylate, was precipitated, filtered, and on recrystallization from ethanol melted at 213–215 degrees centigrade.

5-benzyloxytryptophol is produced by reducing ethyl 5-benzyloxy-3-indoleglyoxylate with lithium aluminum hydride by the procedure disclosed in Example 1.

EXAMPLE 5
5-Chlorotryptophol 5-chlorotryptophol is produced by reducing 5-chloro-3-indoleglyoxylic acid with lithium aluminum hydride by the procedure disclosed in Example 1.

In the same manner other halotryptophols such as 2-(para - chlorobenzyl) - 5 - bromotryptophol, 2-methyl-6-chlorotryptophol, 4,6-dibromotryptophol, and the like, are produced by reducing methyl 2-(para-chlorobenzyl)-5-bromo-3-indoleglyoxylate, 2-methyl-6-chloro-3-indoleglyoxylyl chloride, and 4,6-dibromo-3-indoleglyoxylic propionic anhydride, respectively, with lithium aluminum hydride.

EXAMPLE 6
2-Phenyl-6-Hydroxytryptophol 2-phenyl-6-hydroxytryptophol is produced by reducing 2-phenyl-6-acetoxy-3-indoleglyoxylyl chloride with lithium aluminum hydride by the procedure disclosed in Example 1.

In the same manner other hydroxytryptophols such as, 2 - ($\alpha$ - naphthyl) - 4 - hydroxytryptophol, 5 - hydroxytryptophol, 2-ethyl-4,6-dihydroxytryptophol, and the like, are produced by reducing potassium 2-($\alpha$-naphthyl)-4-propionoxy-3-indoleglyoxylate, 5-butyroxy-3-indoleglyoxylic acid, and ethyl 2-ethyl-4,6-diacetoxy-3-indoleglyoxylate, respectively, with lithium aluminum hydride.

EXAMPLE 7
4-Methyloltryptophol 4-methyloltryptophol is produced by reducing 4-carboxy-3-indoleglyoxylic acid with lithium aluminum hydride by the procedure disclosed in Example 1.

In the same manner other methyloltryptophols such as, 2-propyl-6-methyloltryptophol, 2-(para-chlorobenzyl)-5-methyloltryptophol, 2 - phenyl-4,5-dimethyloltryptophol, and the like, are produced by reducing propyl 2-propyl-6-carboxy-3-indoleglyoxylate, 2-(para-chlorobenzyl)-5-carboxy-3-indoleglyoxylic acid, and 2-phenyl-4,5-dicarboxy-3-indoleglyoxylyl chloride, respectively, with lithium aluminum hydride.

EXAMPLE 8
5,6-Dimethoxytryptophol 5,6-dimethoxytryptophol is produced by reducing 5,6-dimethoxy-3-indoleglyoxylyl chloride with lithium aluminum hydride by the procedure disclosed in Example 1.

In the same manner other alkoxytryptophols such as, 2-tolyl-4-ethoxytryptophol, 2-biphenylyl-7-propoxytryptophol, 6-butoxytryptophol, and the like, are produced by reducing barium 2 - tolyl - 4 - ethoxy-3-indoleglyoxylate, propyl 2-biphenylyl-7-propoxy-3-indoleglyoxylate, and 6-butoxy-3-indoleglyoxylic acid, respectively, with lithium aluminum hydride.

EXAMPLE 9
2-Phenethyl-5-Methyloltryptophol 2-phenethyl-5-methyloltryptophol is produced by reducing 2-phenthyl-5-carbethoxy-3-indoleglyoxylyl bromide with lithium aluminum hydride by the procedure disclosed in Example 1.

In the same manner other methyloltryptophols such as, 2 - propyl - 4-methyloltryptophol, 2-($\alpha$-naphthyl)-5,6-dimethyloltryptophol, 5-methyloltryptophol, and the like, are produced by reducing propyl 2-propyl-4-carbopropoxy-3-indoleglyoxylate, sodium 2-($\alpha$-naphthyl)-5,6-dicarbethoxy-3-indoleglyoxylate, and 5-carbobutoxy-3-indoleglyoxylic butyric anhydride, respectively, with lithium aluminum hydride.

EXAMPLE 10
4-Aminomethyltryptophol 4-aminomethyltryptophol is produced by reducing 4-cyano-3-indoleglyoxylic anhydride with lithium aluminum hydride by the procedure disclosed in Example 1.

In the same manner other aminomethyltryptophols such as, 2-(para-chlorophenyl)-6-aminomethyltryptophol, 2 - propyl - 4,6 - bis(aminomethyl) - tryptophol, 2-(para-methylbenzyl)-7-aminomethyltryptophol, and the like, are produced by reducing benzyl 2-(para-chlorophenyl)-6-cyano-3-indoleglyoxylate, 2-propyl-4,6-dicyano-3-indoleglyoxylic acid, and 2-(para-methylbenzyl)-7-cyano-3-indoleglyoxylyl bromide, respectively, with lithium aluminum hydride.

EXAMPLE 11
6-Methyltryptophol 6-methyltryptophol is produced by reducing 6-methyl-3-indoleglyoxylic acid with lithium aluminum hydride by the procedure disclosed in Example 1.

In the same manner other alkyltryptophols such as 2,4,7-trimethyltryptophol, 2-phenethyl-5,6-diethyltryptophol, 2-(para-chlorobenzyl)-6-propyltryptophol, 5,7-dibutyltryptophol, and the like, are produced by reducing butyl 2,4,7-trimethyl-3-indoleglyoxylate, 2-phenethyl-5,6-diethyl-3-indoleglyoxylic acid, methyl 2-(para-chlorobenzyl)-6-propyl-3-indoleglyoxylate, and 5,7-dibutyl-3-indoleglyoxylic acetic anhydride, respectively, with lithium aluminum hydride.

EXAMPLE 12
5-Phenoxytryptophol 5-phenoxytryptophol is produced by reducing sodium 5-phenoxy-3-indoleglyoxylate with lithium aluminum hydride by the procedure disclosed in Example 1.

In the same manner other aryloxytryptophols such as, 2-methyl-6-naphthoxytryptophol, 5,6-diphenoxytryptophol, 2-phenyl-4-phenoxytryptophol, and the like, are produced by reducing sodium 2-methyl-6-naphthoxy-3-indoleglyoxylate, 5,6-diphenoxy-3-indoleglyoxylyl bromide, and 2-phenyl-4-phenoxy-3-indoleglyoxylic benzoic anhydride, respectively, with lithium aluminum hydride.

EXAMPLE 13
2,4-Diphenyltryptophol 2,4-diphenyltryptophol is produced by reducing 2,4-diphenyl-3-indoleglyoxylyl chloride with lithium aluminum hydride by the procedure disclosed in Example 1.

In the same manner other aryltryptophols such as, 2-phenethyl-6-phenyltryptophol, 2-($\alpha$-naphthyl)-4,6-diphenyltryptophol, 2-propyl-5-naphthyltryptophol, and the like, are produced by reducing potassium 2-phenethyl-6-phenyl-3-indoleglyoxylate, 2-($\alpha$-naphthyl)-4,6-diphenyl-3-indoleglyoxylic acid, and phenyl 2-propyl-5-naphthyl-3-indoleglyoxylate, respectively, with lithium aluminum hydride.

EXAMPLE 14
2,5-Dibenzyltryptophol 2,5-dibenzyltryptophol is produced by reducing 2,5-dibenzyl-3-indoleglyoxylic acid with lithium aluminum hydride by the procedure disclosed in Example 1.

In the same manner other aralkyltryptophols such as, 4-phenethyltryptophol, 2-(para-chlorobenzyl)-5-benzyltryptophol, 2-phenyl-5-(para-methoxybenzyl)-tryptophol, and the like, are produced by reducing 4-phenethyl-3-indoleglyoxylyl chloride, benzyl 2-(para-chlorobenzyl)-5-benzyl-3-indoleglyoxylate, and 2-phenyl-5-(para-methoxybenzyl)-3-indoleglyoxylic acetic anhydride, respectively, with lithium aluminum hydride.

EXAMPLE 15

*1-Benz-(g)-Tryptophol*

1-benz-(g)-tryptophol is produced by reducing 1-benz-(g)-3-indoleglyoxylic anhydride with lithium aluminum hydride by the procedure disclosed in Example 1.

In the same manner other benztryptophols such as, 2-methyl-1-benz-(e)-tryptophol, 2-benzyl-1-benz-(g)-tryptophol, 1-benz-(f)-tryptophol, and the like, are produced by reducing 2-methyl-1-benz-(e)-3-indoleglyoxylic acid, butyl 2-benzyl-1-benz-(g)-3-indoleglyoxylate, and barium 1-benz-(f)-3-indoleglyoxylate, respectively, with lithium aluminum hydride.

EXAMPLE 16

*4-Diethylaminotryptophol*

4-diethylaminotryptophol is produced by reducing 4-diethylamino-3-indoleglyoxylic acetic anhydride by the procedure disclosed in Example 1.

In the same manner other dialkylaminotryptophols such as, 4,6-bis(dimethylamino)-tryptophol, 2-biphenylyl-5-diethylaminotryptophol, 2-propyl-5,6-bis(dipropylamino)-tryptophol, and the like, are produced by reducing 4,6-bis(dimethylamino)-3-indoleglyoxylic acid, benzyl 2-biphenylyl-5-diethylamino-3-indoleglyoxylate, and 2-propyl-5,6-bis(dipropylamino)-3-indoleglyoxylyl bromide, respectively, with lithium aluminum hydride.

EXAMPLE 17

*Tryptophol*

In essentially the same manner as disclosed in Example 1, a solution of 19.7 grams (0.1 mole) of methyl 3-indoleglyoxylate was prepared in 200 milliliters of absolute ethanol. After adding 0.3 gram of platinum oxide catalyst, the solution was shaken in a Parr reduction apparatus and in two hours the theoretical absorption of hydrogen was observed. The catalyst was filtered and the solution concentrated. The remaining reddish oil was crystallized from a mixture of ether and petroleum ether. The product, methyl 3-indoleglycolate, melted at 81–82 degrees centigrade in agreement with the value of Baker, J. Chem. Soc. 1940, 458.

Ten grams of methyl 3-indoleglycolate was dissolved in 100 milliliters of tetrahydrofuran. The solution was added with stirring to a solution of 3.7 grams of lithium aluminum hydride in 100 milliliters of tetrahydrofuran. After refluxing for two hours the excess reducing agent was destroyed with U.S.P. ether and ten percent sodium hydroxide solution. The solvent layer was decanted and the hydroxide precipitate washed with ether. The combined solvent layer and washings were concentrated and the oil distilled under reduced pressure. The product boiled at 152–156/0.1 millimeter of mercury pressure. On recrystallization from ethyl acetate-petroleum ether the product, tryptophol, melted at 56–57 degrees centigrade.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. In a process for the preparation of 3-(2-hydroxyethyl)-indoles, the step of reducing 3-indoleglyoxylic acids with lithium aluminum hydride.

2. In a process for the preparation of 3-(2-hydroxyethyl)-indoles, the step of reducing with lithium aluminum hydride an indole having the formula:

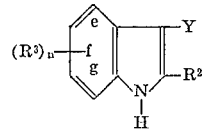

wherein $R^2$ is selected from the group consisting of hydrogen, aryl, aralkyl, and lower-alkyl, $(R^3)_n$ is selected from the group consisting of carboxy, cyano, dialkylamino, lower-carbalkoxy, halogen, lower-alkyl, aryl, aralkyl, aryloxy, lower-alkoxy, a benzyloxy, an acyloxy radical wherein the acyl substituent is from an organic carboxylic acid, $n$ is an integer from zero to four, $R^3$ is a fused arylene radical, and Y is selected from the group consisting of

wherein R is a carboxylic acid radical, and also

wherein $R'$ is selected from the group consisting of a carboxy radical and the esters and salts thereof.

3. In a process for the preparation of 5-benzyloxytryptophol, the step of reducing ethyl 5-benzyloxy-3-indoleglyoxylate with lithium aluminum hydride.

4. In a process for the preparation of tryptophol, the step of reducing benzyl 3-indoleglyoxylate with lithium aluminum hydride.

5. In a process for the preparation of 2-phenyl-6-hydroxytryptophol, the step of reducing 2-phenyl-6-acetoxy-3-indoleglyoxylyl chloride with lithium aluminum hydride.

6. In a process for the preparation of 5,6-dimethoxytryptophol, the step of reducing 5,6-dimethoxy-3-indoleglyoxylyl chloride with lithium aluminum hydride.

7. In a process for the preparation of 6-methyltryptophol, the step of reducing 6-methyl-3-indoleglyoxylic acid with lithium aluminum hydride.

8. In a process for the preparation of 3-(2-hydroxyethyl)-indoles, the step of reducing 3-indoleglycolic acids with lithium aluminum hydride to produce 3-(2-hydroxyethyl)-indoles.

9. Ethyl 5-benzyloxy-3-indoleglyoxylate.

References Cited in the file of this patent

UNITED STATES PATENTS 2,305,501   Spielman _____ Dec. 15, 1942
2,704,763   Koehneke et al. _____ Mar. 22, 1955

OTHER REFERENCES

Journ. Am. Chem. Soc., vol. 52, page 5030 (1930).
Justus: Liebig's Ann. der Chem., vol. 520, page 20 (1935).
Journ. Am. Pharm. Assoc., vol. 32, page 84 (1943).
Journ. Am. Chem. Soc., vol. 72, pages 3586–8 (1950).